Figure 4:
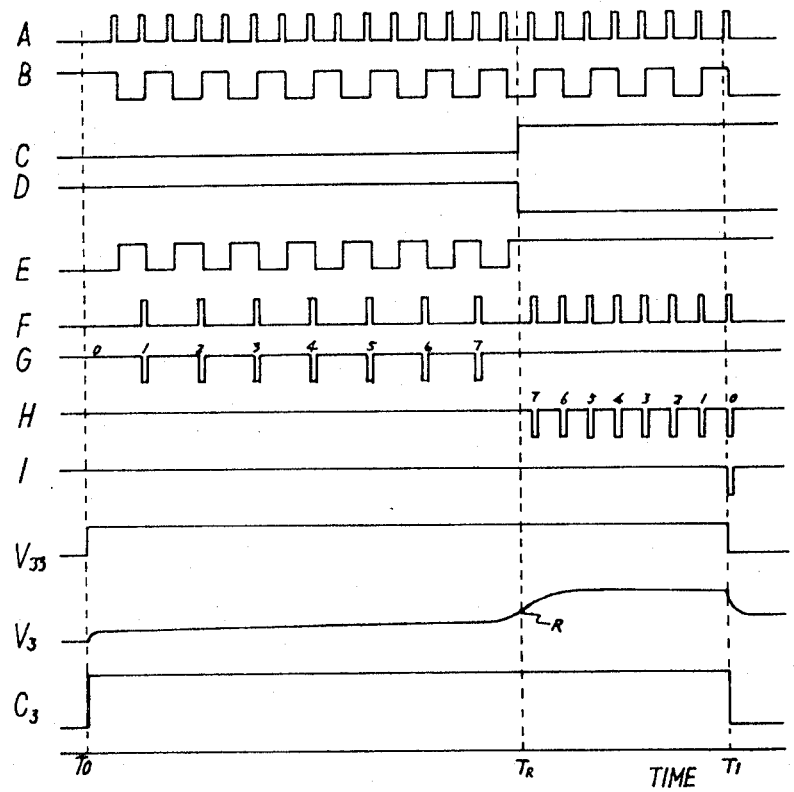

United States Patent [19]
Arai et al.

[11] 3,748,567
[45] July 24, 1973

[54] STORAGE BATTERY CHARGING DEVICE
[75] Inventors: Hiroshi Arai, Osaka; Yoshiaki Komuro, Nishinomiya; Akinari Kasai, Osaka, all of Japan
[73] Assignee: Sansha Electric Manufacturing Company Limited, Osaka, Japan
[22] Filed: Oct. 19, 1972
[21] Appl. No.: 299,057

[30] Foreign Application Priority Data
Nov. 29, 1971 Japan.............................. 46/96544

[52] U.S. Cl....................... 320/22, 320/31, 320/39, 320/45
[51] Int. Cl. ............................................. H02j 7/04
[58] Field of Search ............320/20–23, 31, 44, 45, 320/39, 40, 37

[56] References Cited
UNITED STATES PATENTS
3,329,882  7/1967  Sobel .............................. 320/45 X
3,421,066  1/1969  Flynn et al ....................... 320/23 X
3,484,681  12/1969  Grady, Jr. et al. ............. 320/44 UX Primary Examiner—J. D. Miller
Assistant Examiner—Robert J. Hickey
Attorney—Eugene E. Geoffrey, Jr.

[57] ABSTRACT

A battery charger having means for measuring the quantity of energy imparted to a battery before the reversing point of the charge at which there is a sudden, step-like change in voltage, and then imparting a quantity of energy to the battery which constitutes a selected proportion of the energy imparted before the reversing point.

The means for measuring the quantity of energy imparted comprise a variable frequency pulse generator and a reversible counter with the step-like change in voltage changing the frequency of the pulse generator and changing the mode of operation of the reversible counter from addition to subtraction; the charging operation is interrupted when the counter has counted down to zero.

3 Claims, 6 Drawing Figures

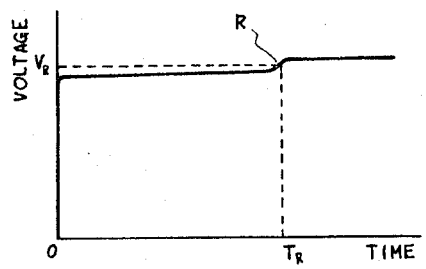
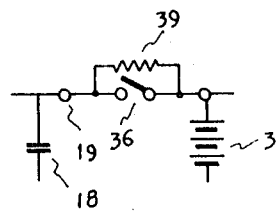
FIG. 1          FIG. 5
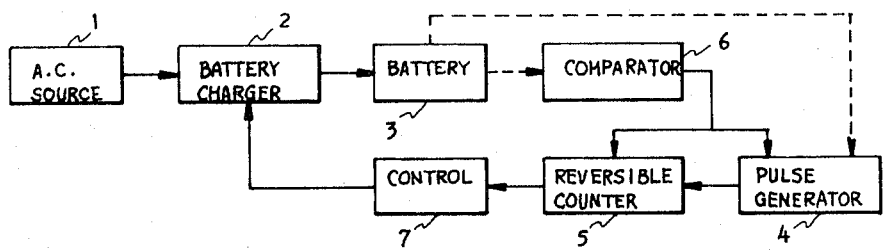
FIG. 2
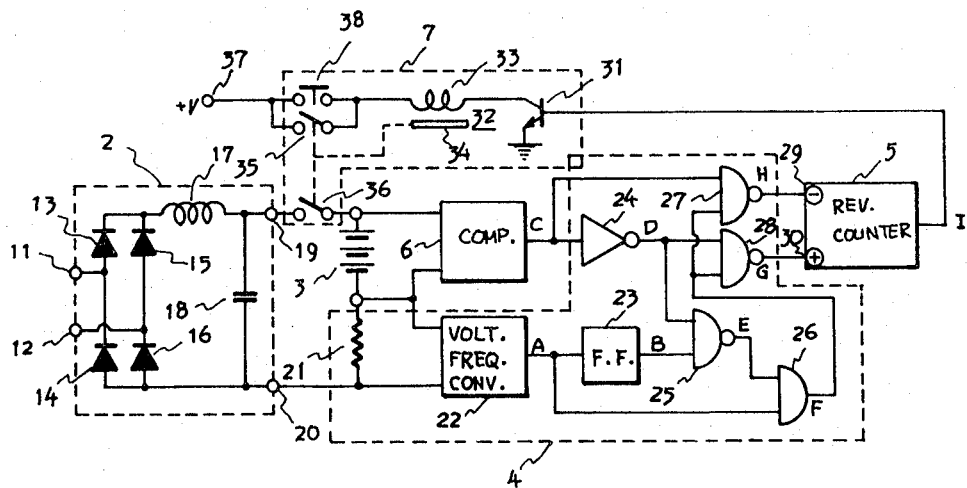
FIG. 3

STORAGE BATTERY CHARGING DEVICE

This invention relates to an improved storage battery charging device and more particularly to an improved control device which can automatically control the optimum quantity of energy to be imparted to the battery.

The most useful method of prior art for effecting a proper charging of a storage battery to prevent excessive charging has been carried out by detecting the discharged quantity of energy of the battery previously by an ampere-hour meter and then imparting a quantity of energy to the battery corresponding to about 120 percent of the discharged energy. Although this method is relatively effective, its utility is undesirably limited because it is impossible to detect the quantity of natural discharge during its unused period and, moreover, each battery must be provided with an ampere-hour meter. Therefore, an object of this invention is to provide an improved storage battery charging device which can automatically detect the quantity of energy which has been discharged from the battery and control the quantity of energy delivered to the battery to provide a proper charge under all conditions.

In the case of charging a battery in general, the terminal voltage of the battery increases slowly but, after some length of time, it exhibits a sudden step-like increase. This stepping point is generally referred to as the "reversing point" and the terminal voltage at this point is referred to as the "reversing voltage." After the reversing point the rate of increase of the terminal voltage becomes small again and tends to taper off to zero. It has been found that this reversing voltage is characteristic of the battery and is fixed regardless of the discharged quantity of energy, and that the quantity of energy delivered before the reversing point and after commencement of charging is substantially proportional to the discharged quantity and corresponds to about 80 percent of the discharged quantity. As the optimum charged quantity has been known in view of the charging efficiency as about 120 percent of the discharged quantity, it means that it is necessary and sufficient to impart a charge to the battery corresponding to 40 percent of the discharged quantity, that is, a half of the quantity which has been imparted to the battery before the reversing point. This is the principle which has been applied to this invention.

According to this invention, the battery charging device comprises an a.c. source, a conventional battery charger for rectifying the current from a.c. source, a voltage comparator for detecting the reversing voltage and producing a detection signal, a variable frequency pulse generator which changes its characteristic frequency in response to said detection signal, a reversible counter for counting the number of pulses produced from said pulse generator, which changes its operation from addition to subtraction in response to the detection signal from the comparator and produces a signal when the count becomes zero, and a switch control device for stopping the charging operation of the battery charger in response to the signal from the counter.

Other objects and features of this invention will be clearly understood by reading the following description with reference to the accompanying drawings.

Figure 6:
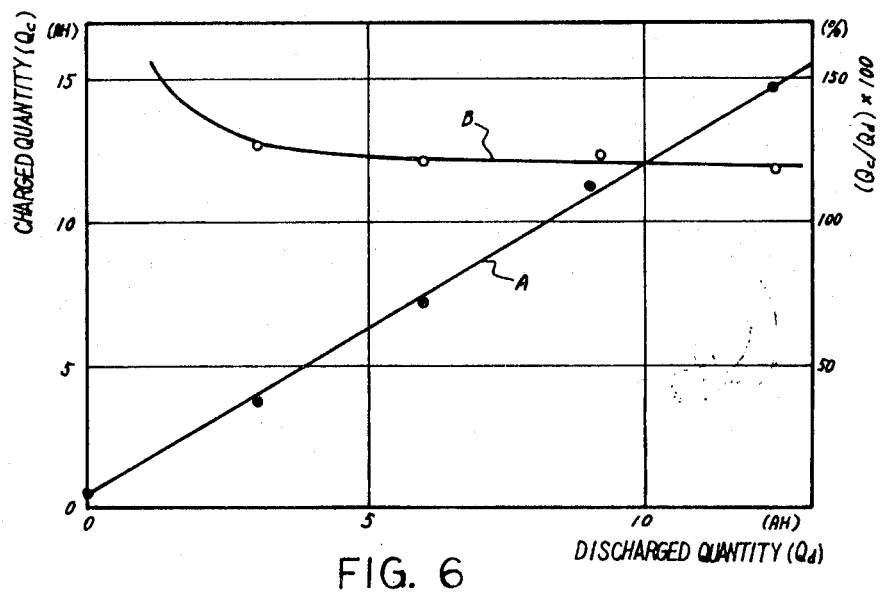

In the Drawings:

FIG. 1 is a diagram showing the change of the terminal voltage of a battery during a charging operation, FIG. 2 is a block diagram illustrating a basic configuration of the storage battery charging device according to this invention, FIG. 3 is a circuit diagram partly in block form of one embodiment of the charging device according to this invention, FIG. 4 is a waveform diagram showing various waveforms appearing at various points of the circuit of FIG. 3, FIG. 5 is a fragmentary circuit diagram of another embodiment of this invention, and FIG. 6 is a diagram showing test results obtained with the device according to this invention.

Throughout the drawings like reference numerals are used to denote corresponding elements.

FIG. 1 shows the variation of the terminal voltage of a battery with time. As shown, the terminal voltage increases very slowly after commencement of the charging operation but at a specific point $T_R$ it exhibits a sudden step-like increase R. This point R is referred to as "reversing point" and the voltage $V_R$ at the reversing point is referred to as "reversing voltage," as previously defined. Although the time $T_R$ varies with the quantity of energy which has been discharged, the reversing voltage $V_R$ is substantially always constant. Therefore, if the reversing voltage $V_R$ is previously measured by a test measurement, the reversing point R can be detected with reference to the reversing voltage $V_R$, for example, by a voltage comparator.

Referring now to FIG. 2 representing a basic circuit configuration of this invention, a storage battery 3 which is to be charged is connected through a battery charger 2 to an a.c. source 1 such as commercial line voltage terminals. The battery charger 2 may be a conventional one including a rectifying circuit. The block 6 is a voltage comparator which is coupled to the battery 3 and serves the function of comparing the terminal voltage of the battery 3 with the reversing voltage $V_R$ which has been stored therein and producing a signal when the terminal voltage exceeds the reversing voltage.

The block 4 is a pulse generator which has at least two characteristic frequencies which can be switched in response to the signal applied from the voltage comparator 6. The pulses generated from the pulse generator 4 are counted by a reversible counter 5 which can effect successive addition and subtraction operations. The addition and subtraction operations of the counter 5 can be switched mutually in response to the signal from the comparator 6 and the counter 5 produces a signal when the count becomes zero. The signal from the counter 5 is applied to a battery charger control 7 which serves the function of shutting off the charging operation of the battery charger 2 in response to the signal from the counter 5.

With the apparatus as described above, the pulse counting operation is commenced at the same time as the commencement of battery charging operation and continued until the reversing point R is detected by the voltage comparator 6.

After the reversing point, however, as the pulse frequency is changed and the mode of counting operation is reversed, the counter 5 successively subtracts the pulses from the pulse generator 4 from the count obtained before the reversing point at a different frequency or speed and reaches the zero count after a length of time which is different from the time taken before the reversing point. As the battery charger 2 is shut off by the control device 7 when zero count is obtained by the counter 5, the time interval between the commencement of charging operation and the reversing point is different from the time interval between the reversing point and the interruption of the charging operation and the ratio of both time intervals corresponds to the ratio of both frequencies previously set in the pulse generator 4. This means that this device can automatically control the quantity of energy imparted to the battery after the reversing point with respect to the quantity of energy imparted before the reversing point.

In FIG. 2, the dashed line connected the battery 3 and the pulse generator 4 represents a circuit for detecting the current flowing through the battery 3 and applying a signal proportional to this current. In this case the pulse generator 4 has to be a variable frequency pulse generator having a frequency which varies with the level of the above signal. This is effective for correcting a charging error which may happen if the charging current is not fixed throughout the charging operation.

The operation of the invention will be more clearly described in conjunction with the embodiment of FIG. 3. In FIG. 3 the dashed blocks 2, 4 and 7 correspond respectively to the battery charger 2, pulse generator 4, and control device 7 of FIG. 2 and the battery to be charged is denoted by the numeral 3. The battery charger 2 having input terminals 11 and 12 to be connected to a commercial a.c. source (not shown) and output terminals 19 and 20 is a conventional one which includes a full-wave rectifying circuit consisting of diodes 13, 14, 15 and 16 and a filtering circuit consisting of an inductor 17 and a capacitor 18. The output terminals 19 and 20 of the battery charger 2 are respectively connected through a normally-open switch 36 and a voltage dividing resistor 21 to both terminals of the battery 3.

The terminal voltage of the battery 3 is applied to a voltage comparator 6 which is arranged to produce "1" output signal when the terminal voltage exceeds the reversing voltage which is previously stored therein, and the output of the comparator 6 is applied to a NOT circuit 24 and to one input of a NAND gate 27. The voltage across the resistor 21, which is proportional to the current flowing through the battery is applied to a voltage-frequency converter 22 which produces a pulse train having a frequency which is proportional to the applied voltage and, accordingly, the current through the battery 3. The output pulses from the converter 22 are applied to a flip-flop 23 and one input of an AND gate 26, the other input of the AND gate 26 being the output of a NAND gate 25 having one input connected to the output of the flip-flop 23 and other input connected to the output of the NOT circuit 24 which is also connected to one input of a NAND gate 28. The output of the AND gate 26 is applied to the other inputs of the NAND gates 27 and 28 respectively.

The output of the NAND gate 27 is connected to the subtraction input 29 of a reversible counter 5 and the output of the NAND gate 28 is connected to the addition input 30 thereof. The reversible counter 5 normally produces "1" signal but produces "0" output signal when the zero count is reached.

The control circuit 7 includes a transistor 31 having a gate electrode connected to the output of the counter 5, an emitter electrode grounded and a collector electrode connected through an electromagnetic winding 33 of an electromagnetic relay 32 and a parallel connection of a normally-open switch 35 and a pushbutton switch 38 to a constant voltage terminal 37 (tr). The switches 35 and 36 are coupled to the armature 34 of the relay 32 and close simultaneously when the relay is energized.

The operation of the circuit of FIG. 3 will now be described with reference to the waveform diagram of FIG. 4.

When the pushbutton switch 38 is manually closed, a current flows from the terminal 37 through the winding 33 and the transistor 31 to the ground since "1" output is normally applied from the reversible counter 5 to the base electrode of the transistor 31. Thus, the relay 32 is energized to close the switches 35 and 36 and the charging operation of the battery is commenced. Both switches 35 and 36 are held in the closed state by the relay 32 until the voltage $V_{33}$ across the winding 33 is removed, even if the pushbutton switch 38 is released.

Assuming the charging current through the resistor 21 is fixed and the voltage thereacross is therefore fixed, the voltage-frequency converter 22 produces a pulse train of constant frequency as shown at A in FIG. 4. This pulse train is supplied to the flip-flop 23 and converted into a continuous signal having a waveform as shown at B of FIG. 4.

Before the reversing point is detected by the comparator 6, the output C of the comparator 6 is "0" and the output D of the NOT circuit 24 is therefore "1." Accordingly, the output E of the NAND gate 25 shows a waveform which is an inversion of the output B as shown at E in FIG. 4 before the reversing point R is reached. Therefore, the output of the AND gate 26 having the waveforms A and E as its inputs produces a waveform as shown at F in FIG. 4 which is a pulse train having a frequency equal to half of the frequency of the output A. While the output F of the AND gate 26 is applied to one input of the NAND gates 27 and 28 respectively, the gate 27 produces a continuous "1" output as shown at H in FIG. 4 and the gate 28 produces an output waveform G which is an inversion of the output F. The "0" level pulses of the output G are supplied to the additional terminal of the reversible counter 5 and counted accumulatively until the reversing point is reached.

When the reversing point R is reached as shown in the waveform of the terminal voltage $V_3$ of the battery, the comparator 6 detects it to produce "1" output as shown at C of FIG. 4 and the output D of the NOT circuit 24 becomes "0." Therefore, the output E of the NAND gate 25 becomes "1" and the AND gate 26 produces a pulse train which is equivalent to the output A. Therefore, the output G of the NAND gate 28 is rendered to have "1" level constantly and the output H of the NAND gate 27 exhibits a waveform which is an inversion of the waveform A. Thus, the accumulative counting operation of the counter 5 is ceased at the reversing point and a subtractive counting operation is effected thereafter.

As the frequency of the pulse train H is twice as large as that of the pulse train G, the time taken for reaching the zero count of the counter 5 after the reversing point ($T_R - T_1$, FIG. 4) is a half of the time taken for reaching the reversing point after the commencement of charging operation ($T_0 - T_R$, FIG. 4). Therefore, the charged quantity after the reversing point is substantially equal to a half of the charged quantity before the reversing point and if the charged quantity before the reversing point corresponds to 80 percent of the discharged quantity as suggested in the preface, the optimum 120 percent charge is obtained by the above mentioned operation. When the zero count is reached by the counter 5 and the optimum charging is completed, the counter 5 produces "0" output as shown by I in FIG. 4. Therefore, the transistor 31 is cut off to de-energize the relay 34 and the switches 35 and 36 are restored to the original open state to interrupt the charging operation.

Although it is assumed in the above operation that the charging current is fixed throughout the charging operation as shown at $C_3$ of FIG. 4, it may vary sometimes especially when a battery charger of low class is used. However, it is self-evident to those skilled in the art that the ratio of the charged quantities before and after the reversing point is conserved even if the charging current varies during the charging operation since the frequency of the pulses counted by the counter 5 traces automatically the value of the charging current by means of the voltage-frequency converter 22. Therefore, it is of course evident that a simple pulse generator may be substituted for the converter 22 when a constant current battery charger is used.

Although, in the circuit of FIG. 3, the ratio of the charged quantities before and after the reversing point is fixed at 2, it is convenient to arrange the circuit so that the ratio can be controlled arbitrarily as occasion demands. Such circuit is also included in the scope of this invention and various configurations can therefore be considered. For example, the elements 23, 25 and 26 may be omitted from the circuit of FIG. 3 and the output of the converter 22 applied directly to the NAND gates 27 and 28. Then the output of the comparator 6 may be applied to the converter 22 to change the time constant thereof arbitrarily.

It should be noted that the term "interruption" in the specification and claims does not always mean a complete disconnection of the charging circuit from the battery. For example, as shown in FIG. 5, a high resistance 39 may be connected across the switch 36 for preventing natural discharge of the battery 3 when it is left as it is for a long time after completion of the charging operation.

FIG. 6 shows the result of a test measurement which was carried out with a battery charging device constructed in accordance with the circuit of FIG. 3 under the following condition:

Storage battery used:
  rated capacity        12 ampere-hours
  voltage               12 volts
  type                  lead battery
Voltage detected by voltage
  comparator            14.3 volts
Charging and discharging current   2.4 amperes (const.)
Maximum increase of
  liquid temperature    less than 10°C
  during charging operation
Ambient temperature     25°C In FIG. 6 the discharged quantity of energy $Qd$ is scaled on the abscissa and the charged quantity of energy $Qc$ is scaled on the lefthand side. The percent ratio $Qc/Qd$ is scaled on the righthand side. When the quantity of energy $Qc$ charged automatically by the device was measured in correspondence with various discharged quantities $Qd$, Curve A was obtained and Curve B indicating the percent ratio of $Qc/Qd$ was obtained through a calculation from Curve A. As shown by Curve B, the ratio $Qc/Qd$ was about 120 percent and optimum when the discharged quantity was greater than 3 ampere-hours, but a tendency of excessive charging appeared below 3 ampere-hours. However, the excessive amount of the charged quantity was very small in comparison with the rated capacity of the battery and the increase of the liquid temperature was almost zero and, therefore, undesirable affects on the battery could be neglected.

As described in the above description to this invention, any battery having an unknown discharged quantity can be charged automatically to an optimum quantity of energy for said battery. Therefore, it is unnecessary to measure previously the discharged quantity by an ampere-hour meter or the like and the device has wide use for charging various storage batteries especially for automobiles exhibiting unfixed discharged quantities. The invention also has the advantage of reducing power consumption required for charging and extending life time of the battery.

What is claimed is:

1. A storage battery charging device comprising an a.c. source, a battery charger for rectifying the a.c. current from said a.c. source and supplying a rectified current to a storage battery to be charged, a voltage comparator for comparing the terminal voltage of said battery with the characteristic reversing voltage of said battery and producing a detection signal when the terminal voltage exceeds the reversing voltage, a pulse generator having at least two characteristic frequencies which can be switched in response to said detection signal from the voltage comparator, a reversible counter for counting the pulses generated from said pulse generator, said reversible counter being arranged to change the mode of operation from addition to subtraction in response to the detection signal of the voltage comparator and produce a zero count signal when the count reaches zero, and a battery charger control for interrupting the charging operation of the battery charger in response to the zero count signal from the reversible counter.

2. A storage battery charging device according to claim 1 wherein said pulse generator includes a variable frequency pulse generator for detecting the current flowing through said battery to modify said characteristic frequencies, whereby said frequencies are always proportional to said current.

3. A storage battery charging device according to claim 1 wherein the ratio of the characteristic frequencies of said pulse generator produced before and after the application of said detection signal is established as 2, whereby a charge of half of the quantity of energy charged before said detection signal is imparted to the battery after said detection signal.

* * * * *